United States Patent
Takahashi

(10) Patent No.: US 6,961,899 B2
(45) Date of Patent: Nov. 1, 2005

(54) AUTOMATIC TRANSACTION DEVICE

(75) Inventor: Hideyuki Takahashi, Maebashi (JP)

(73) Assignee: Fujitsu Limited, Kawasaki (JP)

(*) Notice: Subject to any disclaimer, the term of this patent is extended or adjusted under 35 U.S.C. 154(b) by 581 days.

(21) Appl. No.: 10/041,584

(22) Filed: Jan. 10, 2002

(65) Prior Publication Data

US 2002/0062283 A1 May 23, 2002

Related U.S. Application Data

(63) Continuation of application No. PCT/JP99/04407, filed on Aug. 16, 1999.

(51) Int. Cl.[7] .............................................. G06F 17/00
(52) U.S. Cl. ...................................... 715/507; 715/506
(58) Field of Search ................................ 715/507, 506, 715/505; 707/1

(56) References Cited

U.S. PATENT DOCUMENTS 5,765,005 A * 6/1998 Maruoka et al. ............ 715/505
5,774,887 A * 6/1998 Wolff et al. ..................... 707/1
6,574,314 B1 * 6/2003 Martino ................... 379/93.17

FOREIGN PATENT DOCUMENTS

JP        HEI 4-340161 A      11/1992

* cited by examiner

Primary Examiner—Sanjiv Shah
(74) Attorney, Agent, or Firm—Staas & Halsey LLP

(57) ABSTRACT

The automatic transaction device includes a storage section for storing form format-data of a plurality of different forms, a display/input section for displaying the plurality of different forms, a selection unit with which a customer selects a desired form out of the displayed forms, a transaction control section for reading from the storage section form format-data corresponding to the form selected by the customer, and a form-printing control section and a print section for printing a form based on the form format-data.

8 Claims, 14 Drawing Sheets

FIG.2

30b; FORM IN WHICH DATA HAS BEEN ENTERED

| NOTIFICATION FOR CHANGE OF ADDRESS | | |
|---|---|---|
| ACCOUNT NUMBER | 1 2 3 4 5 6 7 $D_1$ | ~31a |
| NAME | TAROU FUJITSU $D_2$ | ~32a |
| OLD ADDRESS | 1-2-3, MIDORI-MACHI, TAKASAKI-SHI, GUMMA PREF. $D_3$ | ~33a |
| NEW ADDRESS | 4-5-6, AKA-MACHI, TAKASAKI-SHI, GUMMA PREF. $D_4$ | ~34a |

(b)

30a; FORM

| NOTIFICATION FOR CHANGE OF ADDRESS | | |
|---|---|---|
| ACCOUNT NUMBER | | ~31a |
| NAME | | ~32a |
| OLD ADDRESS | | ~33a |
| NEW ADDRESS | | ~34a |

(a) 40a; FORM

NOTIFICATION FOR CHANGE OF ADDRESS

| | |
|---|---|
| ACCOUNT NUMBER | 1 2 3 4 5 6 7  ~41a  P₁ |
| NAME | TAROU FUJITSU  ~42a  P₂ |
| OLD ADDRESS | 1-2-3, MIDORI-MACHI, TAKASAKI-SHI, GUMMA PREF  ~43a  P₃ |
| NEW ADDRESS | ~44a |

(b) 40b; FORM IN WHICH DATA HAS BEEN ENTERED

NOTIFICATION FOR CHANGE OF ADDRESS

| | |
|---|---|
| ACCOUNT NUMBER | 1 2 3 4 5 6 7  ~41a  P₁ |
| NAME | TAROU FUJITSU  ~42a  P₂ |
| OLD ADDRESS | 1-2-3, MIDORI-MACHI, TAKASAKI-SHI, GUMMA PREF  ~43a  P₃ |
| NEW ADDRESS | 4-5-6, AKA-MACHI, TAKASAKI-SHI, GUMMA PREF  ~44a  D₄ |

FIG.4

50;RECEIPT

THE FOLLOWING NOTIFICATION FOR
CHANGE OF THE ADDRESS HAS BEEN
ACCEPTED.
THANK YOU VERY MUCH.
JULY 7, 1999
FUJITSU BANK TAKASAKI BRANCH

} RECEIPT FORMAT DATA

NOTIFICATION FOR
CHANGE OF ADDRESS

ACCOUNT NUMBER: 1 2 3 4 5 6 7

NAME: TAROU FUJITSU

OLD ADDRESS
1-2-3, MIDORI-MACHI,
TAKASAKI-SHI, GUMMA PREF.

NEW ADDRESS
4-5-6, AKA-MACHI,
TAKASAKI-SHI, GUMMA PREF.

$D_{30}$; IMAGE DATA

FIG.5

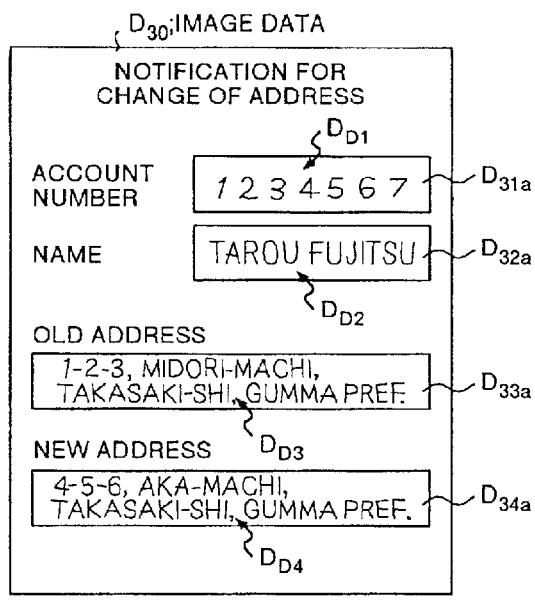

(a)

| CONTENTS OF OCR DEFINITION ||||  |
|---|---|---|---|---|
| ITEM | ATRIBUTE | ITEM POSITION || ... |
| | | LEFT-UPPER-CORNER COORDINATES | RIGHT-UNDER-CORNER COORDINATES | |
| ACCOUNT NUMBER | NUMBER | 4 : 7 | 6 : 20 | ... |
| NAME | MIXED USE | 7 : 7 | 9 : 20 | ... |
| OLD ADDRESS | MIXED USE | 12 : 1 | 14 : 20 | ... |
| NEW ADDRESS | MIXED USE | 17 : 1 | 19 : 20 | ... |

21 — INFORMATION ON FORM FOR NOTIFICATION FOR CHANGE OF ADDRESS
INFORMATION ON FORM FOR NOTIFICATION FOR OPENING OF NEW ACCOUNT
INFORMATION ON FORM FOR NOTIFICATION FOR LOSS OF CARD $F_O$: OCR DEFINITION FILE (b)

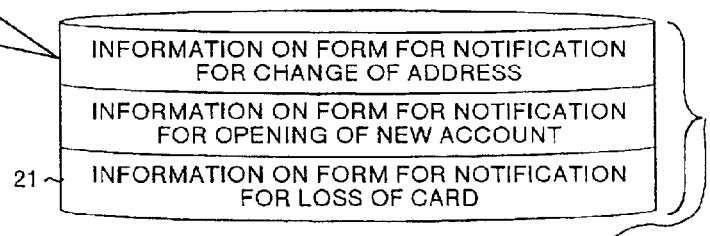

(c)

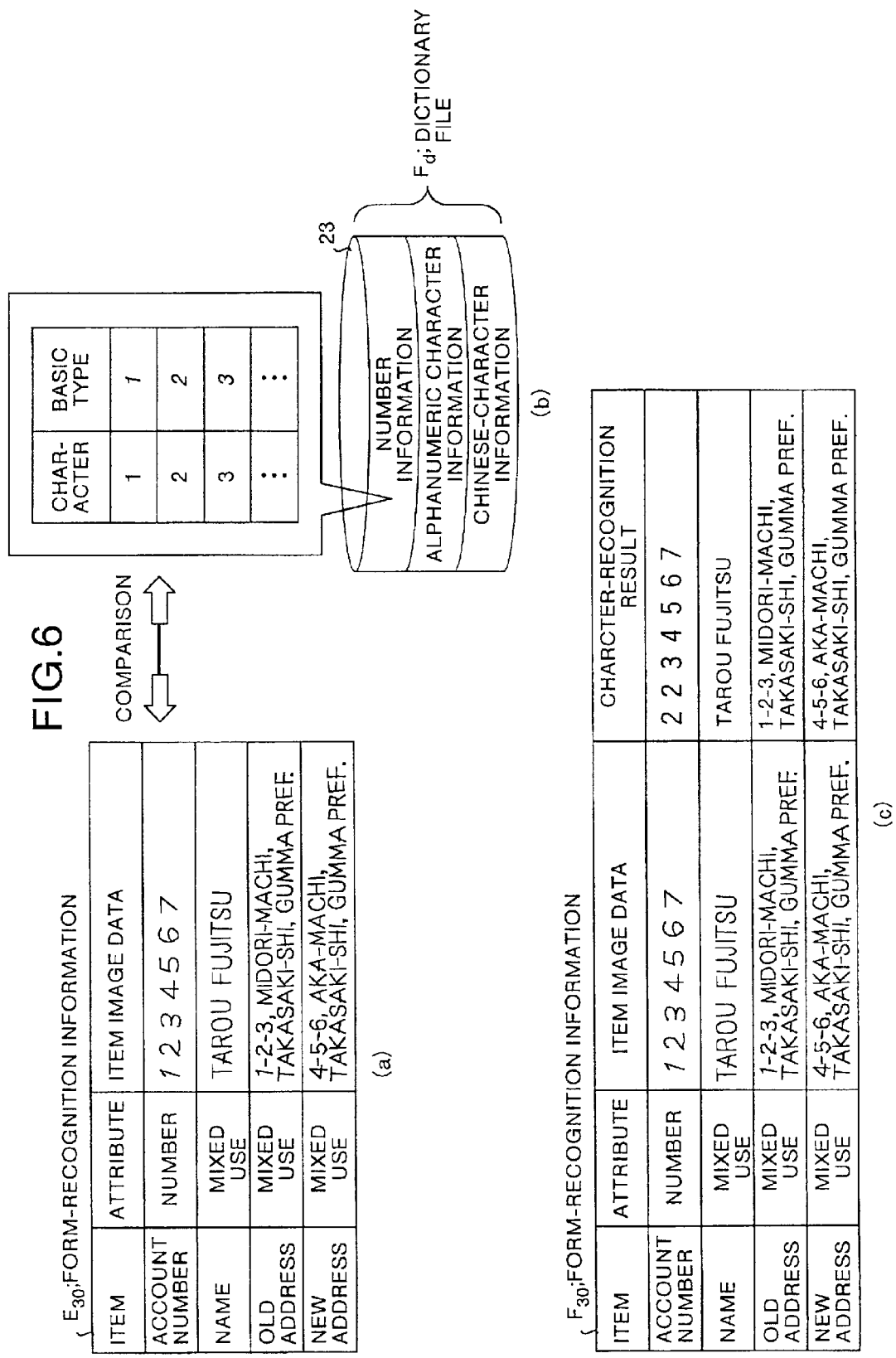

AUTOMATIC TRANSACTION DEVICE

This application is a continuing application, filed under 35 U.S.C. §111(a), of International Application PCT/JP99/04407, filed Aug. 16, 1999.

TECHNICAL FIELD

The present invention relates to an automatic transaction device used for transactions, such as payment, and balance inquiry at financial institutions and the like. Particularly, this invention relates to an automatic transaction device for making and receiving various kinds of forms.

BACKGROUND ART

Recently, automation with computers has been developed in financial institutions and so on. However, transaction operations in which information is hand-written in printed forms, having predetermined formats for each kind of transactions, have still been performed. The forms in which the customer has hand-written the information are submitted at the reception counter. Therefore, there are caused direct effects upon customer services, for example, customers are kept waiting for a long time, as a lot of time is spared for processing of the forms when a large amount of entered forms are received at the reception counter. In addition, the financial institutions have had problems such as high costs for printing of forms, and requirements for spaces for having the forms ready, as all sorts of forms are required to be prepared beforehand. On the other hand, unification and reorganization have been developed among financial institutions by a so-called big bang which has been widely discussed lately. Therefore, improved customer-services, and cost reduction have been required in the financial institutions in order to keep them alive, and a solution for these problems has been eagerly desired.

Forms have been ready in financial institutions for transactions (notification) such as bank transfer, notification of change of an address, notification of opening of a new bank account, and notification of loss of a card. Predetermined formats are printed on the forms according to the kinds of transactions. In other words, there are plural kinds of forms according to the kinds of transactions, and the forms have been separately ready for each kind of transactions on information counters or desks for entry into forms.

The customers select a form for a pertinent transaction among a plurality of kinds of forms; enter predetermined items (an account number, a name, and so on) in the form, and, thereafter, hand in the entered forms to an information desk as steps for transactions in a financial institution. Thereby, the information desk processes the received forms with a form processing device. The above form processing device comprises functions for discerning of the kinds of forms, and for optical recognition of hand-written characters entered on forms.

Then, if there are found oversights or errors in items to be entered, and characters which have been entered in the form can not be recognized during the processing of the form, the information desk calls a customer who has submitted the pertinent form; points out the oversights, the errors, and so on; and asks the customer to enter the items again. The above customer submits the form again, after correcting or revising the pointed parts.

However, there has been a problem that high costs are required for printing of the forms, as, in conventional transactions using forms, the financial institutions are required for smooth operations previously to store various kinds of forms the number of which is equal to or larger than that of a predetermined one. And, as fully enough spaces for having various kinds of the forms ready have been required to be secured, there has been a remarkable problem in securing the spaces, especially, in branch Stores of financial institutions with a narrow floor area.

In addition, there has been also a problem that the customer services are made worse, as there have conventionally been repeated exchanges of forms between a customer and an information desk when there are oversights or errors in items of forms to be entered, and other customers are kept waiting during the exchanges.

It is an object of this invention to provide an automatic transaction device with reduced costs and smaller spaces for forms, and improved customer services.

DISCLOSURE OF THE INVENTION

The automatic transaction device (corresponding to an automatic transaction device 10 in one embodiment which will be described later), according to one aspect of the present invention performs automatic transaction based on interaction with a customer. The automatic transaction device comprises a format-data storage unit (corresponding to a storage section 19 in the one embodiment which will be described later) which stores format-data for a plurality of kinds of forms, a selection unit (corresponding to a transaction control section 12, and a display/input section 13 in the one embodiment which will be described later) which selects of one form among a plurality of the kinds of forms, and a form-making unit (corresponding to the transaction control section 12, a printing section 14, and a form printing control section 17 in the one embodiment which will be described later) which reads format-data for the form selected by the selection unit from the format-data storage unit, and for making a pertinent form, based on the format-data.

According to the above-mentioned aspect, when the customer selects a form from a plurality of different forms using the selection unit, the form selected by the customer is created by the form-making unit. Reduced costs, and smaller spaces for forms may be realized, as forms are configured to be made as required at the side of the automatic transaction device, and there is no need to prepare various kinds of forms beforehand as described above, different from a conventional method.

The automatic transaction device further comprises a form-reading unit (corresponding to the transaction control section 12, an image reading section 15, a form recognition section 20, and a character recognition section 22 in the one embodiment which will be described later) which optically reads a form in which the customer has entered predetermined items ("entered form") into the form created by the form-making unit, and an acceptance unit (corresponding to the transaction control section 12 in the one embodiment which will be described later) which accepts the contents described in the entered form, based on the result of reading by the form-reading unit.

Accordingly, a customer who has received the form created by the form-making unit enters predetermined items into the form, and, thereafter, inputs it as an entered form into the form-reading unit. Thereby, the form-reading unit optically reads the entered form, and, then, passes the reading result on to acceptance unit. Thereafter, the acceptance unit accepts the contents of the entered form, based on the reading result. Thus, the customer services are improved, as the entered form is configured to be automatically accepted, and there is no need to perform the form processing at an information desk, different from a conventional method, to cause shorter waiting time of customers.

The automatic transaction device further comprises a display unit which displays the reading result by the form-reading unit, and the acceptance result by the acceptance unit (corresponding to the display/input section 13 of the one embodiment which will be described later), and a correction unit which corrects the acceptance result (corresponding to the transaction control section 12, and the display/input section 13 of the one embodiment which will be described later), based on the contents displayed on the display unit.

Accordingly, the reading result and the acceptance result are displayed on the display unit, when the contents of the entered form is accepted by the acceptance unit after the entered form is read by the form-reading unit. At this time, the acceptance result is corrected to normal contents by the correction unit, when there are differences between the reading result and the acceptance result. The customer conveniences may be improved, as correction unit is configured to be provided and the acceptance result by the acceptance unit are configured to be corrected, and there is no need for customers to add hand-written corrections to entered forms.

The automatic transaction device further comprises a customer data storage unit which stores customer data of the customers (corresponding to a storage section 71 of the one embodiment which will be described later). Moreover, the form-making unit reads the customer data from the customer data storage unit, and based on the customer data and the format-data creates a form on which the customer data are printed.

Accordingly, the form on which the customer data are printed is made by the form-making unit. Thus, the time required for a customer to write in predetermined items to be entered may be shortened, as the customer information is configured to be printed beforehand on the form.

In the automatic transaction device, the customer data storage unit is a card (corresponding to a card 60 of the one embodiment which will be described later) which a customer holds, and comprises a storage function.

Accordingly, the form on which the customer data are printed can be created based on the customer data and the format-data read from the card which the customer holds. The time required for a customer to write in predetermined items to be entered may be shortened, as the customer data are configured to be printed beforehand on the form.

In the automatic transaction device, the customer data storage unit is a storage unit (corresponding to the storage section 71 of the one embodiment which will be described later) connected to a host computer (corresponding to a host computer 70 of the one embodiment which will be described later) set up in a remote place. Moreover, the form-making unit reads the customer data from the storage unit by access to the host computer through a communication line.

Accordingly, the form on which the customer data are printed can be created by the form-making unit based on the customer data and the format-data, when the customer data are read with the form-making unit from the storage unit by access to the host computer through a communication line. The time required for a customer to write in predetermined items to be entered may be shortened, as the customer data are configured to be printed beforehand on the form, as described above.

In the automatic transaction device, the form-making unit prints the customer data on the form, using a standard font for optical character recognition.

Accordingly, the form-making unit prints the customer data on a form, using the standard font for optical character recognition, when the form is made. Reading errors in the form-reading unit may be reduced, as the customer data are configured to be printed on a form, using the standard font for optical character-recognition as described above.

BRIEF DESCRIPTION OF THE DRAWINGS

FIG. 2 is a view showing a form 30*a*, and an entered form 30*b*, which are shown in FIG. 1;

FIG. 3 is a view showing a form 40*a*, and an entered form 40*b*, which are shown in FIG. 1;

FIG. 4 is a view showing one example of a receipt 50 shown in FIG. 1;

FIG. 5 is an explanatory view of form-recognition processing in a form-recognition section 20 shown in FIG. 1;

FIG. 6 is an explanatory view of character-recognition processing in a character-recognition section 22 shown in FIG. 1;

BEST MODE FOR CARRYING OUT THE INVENTION

Embodiment(s) of the automatic transaction device according to the present invention will be described in detail below while referring to the accompanying drawings.

Figure 1:
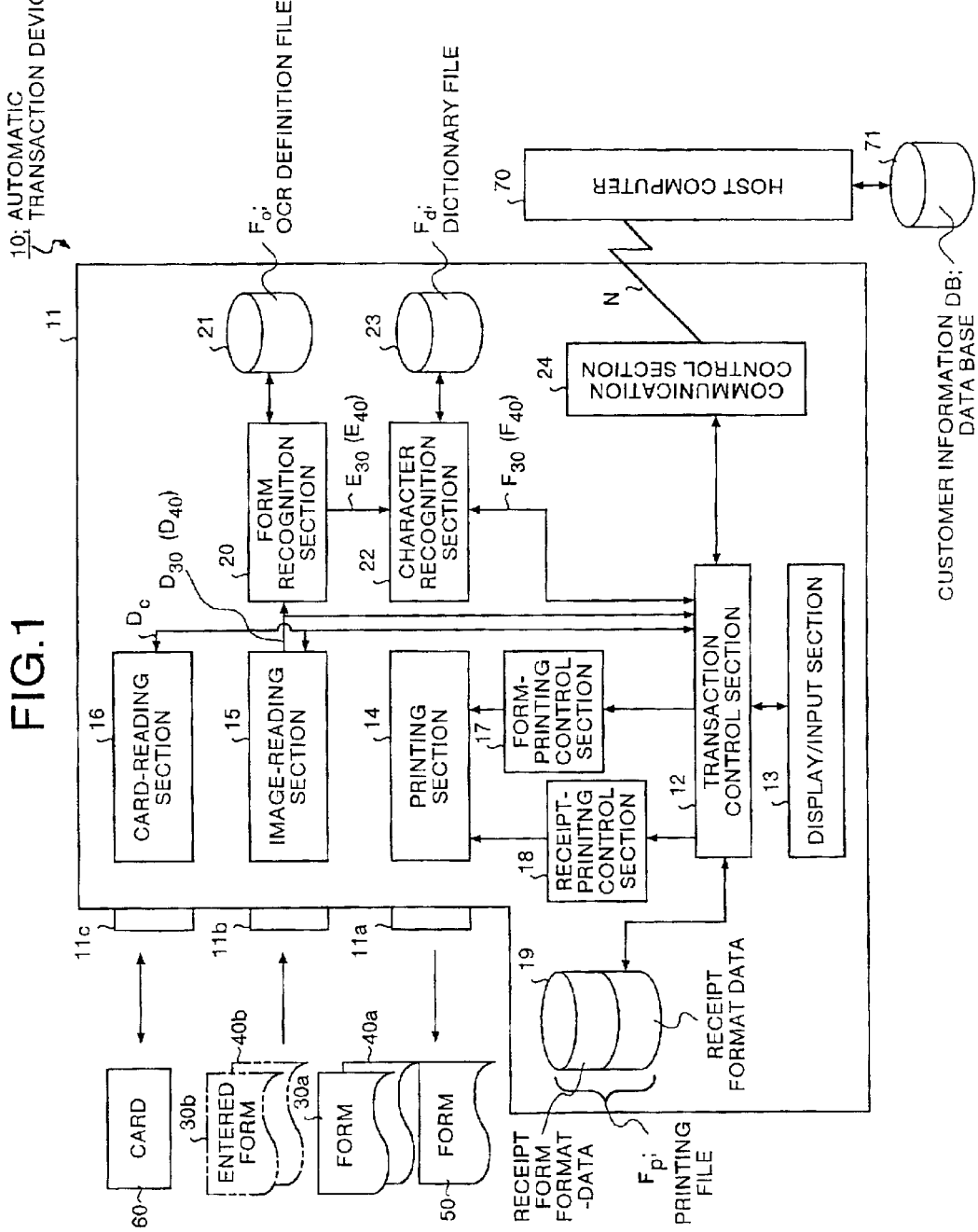
FIG. 1 is a block diagram showing a configuration of one embodiment according to the present invention.

Block diagram in FIG. 1 shows a configuration of the one embodiment according to the present invention. The automatic transaction device 10 according to the present invention is set up in a financial institution such as bank. This automatic transaction device 10 is equivalent to the conventional automatic teller machine (ATM), the cash dispenser (CD), and the automatic depository (AD). The automatic transaction device 10 comprises functions for automatically receiving and making various kinds of forms, as well as functions for automatically performing general transactions such as deposit, payment, transfer, and balance inquiry. Therefore, a configuration for receiving and making various kinds of forms will be mainly described hereinafter.

In the automatic transaction device 10, a case 11 contains mechanical parts, electronic parts, and so on, which form the device. A form-discharging slot 11*a* is provided in a customer-contacting section (not shown), and discharges a form 30*a*, a form 40*a*, and a receipt 50. The forms 30*a* and 40*a*, and the receipt 50 are created in the automatic transaction device 10 itself.

The form 30a is, for example, a form for notification of change of an address, and only a predetermined format such as a frame for entry is printed on the form, as shown in FIG. 2(a), in a similar manner to that of a conventional form which has been prepared in financial institutions. That is, there are printed the following items on the form 30a: an account-number entry frame 31a showing an area for entry of an account number, a name entry frame 32a showing an area for entry of a name, an old-address entry frame 33a showing an area for entry of an old address, and a new-address entry frame 34a showing an area for entry of a new address. Details of the form 30a will be described in an operation example 1 which will be described later.

A part of entry items as well as predetermined formats such as a entry frame are printed on the form 40a shown in FIG. 3(a). That is, an account-number entry frame 41a, a name entry frame 42a, an old-address frame 43a, and a new address frame 44a are printed on the form 40a in a similar manner to those of the form 30a (refer to FIG. 2(a)).

In addition, an account number $P_1$, name $P_2$, and an old address $P_3$ are printed in an account-number entry frame 41a, in a name entry frame 42a, and in an old-address frame 43a on the form 40a, respectively, based on a customer-information data base DB which will be described later. That is, items to be entered have been previously printed in entry frames other than a new-address entry frame 44a, on the form 40a. Here, the form 40a will be described later in details in an operation example 2. Contents to the effect that various notification using the form 30a (form 40a) has been received are printed on the receipt 50 shown in FIG. 4.

Returning to FIG. 1, a form inserting slot 11b is provided at the customer-contacting section of the case 11, and a part into which an entered form 30b, and the same one 40b are inserted. In the entered form 30b, a customer has entered by hand an account number $D_1$, a name $D_2$, an old address $D_3$, and a new address $D_4$ in the account-number entry frame 31a, the name entry frame 32a, the old-name entry frame 33a, and the new address entry frame 34a of the form 30a shown in FIG. 2(a), respectively, as shown in FIG. 2(b) Similarly, in the entered form 40b shown in FIG. 3(b), a customer has entered by hand a new address $D_4$ in the new address entry frame 44a of the form 40a shown in FIG. 3(a).

Returning to FIG. 1, a card inserting slot 11c is provided at the customer-contacting section of the case 11, and a part into which a card 60 is inserted. The above card 60 is a cash card which customers hold, and is made by forming magnetic stripes as a magnetic recording section on a card-type plastic substrate which is formed into dimensions with a lengthwise size of 54 mm, a transverse size of 86 mm, and a thickness of 0.76 mm. Card data (customer information) such as an account number, a password number, and a financial-institution code are recorded on the magnetic stripes. In addition, the card 60 is used for various kinds of transactions such as deposit, payment, transfer, and balance inquiry.

A transaction control section 12 controls each part at various kinds of transactions, and the details of the operations of the transaction control section 12 will be described later. A display/input section 13 is provided at the customer-contacting section of the case 11, and performs displaying and inputting for various kinds of transactions based on an interactive mode between the device and customers. Specifically, the display/input section 13 comprises: a display device as a display section, and a touch panel provided on the surface of the display device as an input section. The above touch panel is a pressure-sensitive pointing device which detects position of a pressed section as information by being pushed down with a finger.

A printing section 14 is, for example, an ink jet printer, and creates the forms 30a and 40a, and the receipt 50 (refer to FIG. 4) by printing predetermined items (such as those in an entry form) on a paper. Moreover, the printing section 14 comprises a transport mechanism that discharges the forms and the receipt from the form-discharging slot 11a after completion of printing.

An image reading section 15 sequentially and optically reads, in lines, images on an image-reading surface of the entered form 30b (entered form 40b) which has been inserted into the form inserting slot 11b, and outputs the read results as image data $D_{30}$ ($D_{40}$) to a form recognition section 20.

The image reading section 15 comprises a transport mechanism for transporting the entered form 30b (entered form 40b) in the scanning direction, a laser irradiating section for laser-beam irradiation on the image reading surface, lenses for collecting laser beams reflected on the image reading surface, a photoelectric conversion section for conversion of the collected laser beams to electric signals, a binarizing section for binarizing the electric signals, based on the comparison results between the levels of the electric signals and the binarized threshold, and for output of the binarized signals to the form recognition section 20 as image data $D_{30}$ ($D_{40}$).

The card reading section 16 magnetically reads the card data (an account number, a password number, a financial-institution code, and so on) from the magnetic stripes of the card 60 inserted through the card inserting slot 11c, and outputs the read results to the transaction control section 12 as card data $D_c$. A form-printing control section 17 performs printing control of the printing section 14 based on printing data input from the transaction control section 12, when the form 30a (form 40a) is made. A receipt-printing control section 18 performs printing control of the printing section 14 based on the printing data input from the transaction control section 12, when the receipt 50 is made.

A storage section 19 stores a printing file $F_p$ used for making various kinds of forms such as the form 30a and the form 40a, and various kinds of receipts such as the receipt 50. The above printing file $F_p$ comprises: a form format-data, and a receipt format-data. The above form format-data are printing data for printing formats such as a title and entry frames, and plural kinds of the data are prepared according to the kinds of forms (notification of change of an address, that of opening of a new account, that of loss of a card, and so on.). As one example, in the case of the form 30a for notification of change of an address shown in FIG. 2(a), the form format-data are printing data for printing of a title (notification of change of an addresses), entry frames (an account-number entry frame 31a through a new-address entry frame 34a).

And, the receipt format-data are printing data for printing typical-expression phrases for the receipts, and plural kinds of the data are prepared according to the kinds of receipts (notification of change of an address, that of opening of a new account, that of loss of a card, and so on.). As one example, in the case of the receipt 50 shown in FIG. 4, the receipt format-data are printing data for printing of a typical-expression phrase saying "The following notification of change of your address has been accepted. . . . Takasaki Branch."

The form recognition section 20 extracts a part including characters as item image data from the image data $D_{30}$ input from the image reading section 15 after discerning the kinds of forms, and outputs the form-recognition information $E_{30}$ (refer to FIG. 5(c)) to the character recognition section 22, based on the extracted results. During the form recognition processing, OCR (Optical Character Recognition) definition file $F_o$ (refer to FIG. 5(b)), which is stored in a storage section 21, is referred to.

The above OCR definition file $F_o$ is a file comprising information for definition of an item in the image area, coordinates for the image area, a size of the image area, and so on to be extracted as item image data for each kind of forms (notification of change of an address, that of opening of a new account, notification of loss of a card, and soon). That is, as shown in FIG. 5(b), the OCR definition file $F_o$ is a file including: information on notification of change of an address corresponding to the form 30a for notification of change of an address, information on notification of opening of a new account corresponding to the form for notification of opening of a new account, and information on notification of loss of a card corresponding to the form for notification of loss of a card.

For example, the following items are defined in the information on notification of change of an address shown in FIG. 5(b): "account number" as an item of an image area, "number" as an attribute of characters existing in the image area, and "item position" as a position of the image area, respectively. An item "left-upper-corner coordinates" of the "item position" defines coordinates (four dots in the longitudinal direction, and seven dots in the transverse direction) of a left-upper-corner of the image area (an area of the image data $D_{31a}$ for the account number entry frame) in a coordinate system having the origin at the left-upper-corner of the image data $D_{30}$. And, an item "right-under-corner coordinates" defines coordinates (six dots in the longitudinal direction, and twenty dots in the transverse direction) of a right-under-corner of the image area (an area of the image data $D_{31a}$ for the account number entry frame).

Similarly, information on notification of change of an address defines "attribute" and "item position" for other items ("name", "old address", and "new address"), respectively. Here, mixed use in "attribute" indicates the mixed use of letters, numbers, Chinese characters, alphabets, and so on in the image areas. Moreover, in the OCR definition file $F_o$, other pieces of information, that is, information on notification of opening of a new account, and information on notification of loss of a card also define "item", "attribute", "item position", and so on in a similar manner to those of the information on notification of change of an address, respectively.

And, the form recognition section 20 outputs, for example, the form-recognition information $E_{30}$ shown in FIG. 5(c) to the character recognition section 22, after completion of the form recognition processing. The above form-recognition information $E_{30}$ relates the extracted item image data with information of "item", that of "attribute", and that of "item image data", which are shown in FIG. 5(b), corresponding to the item image data. Here, the form recognition section 20 outputs the form-recognition information $E_{40}$ with a similar data structure to that of the form-recognition information $E_{30}$ to the character recognition section 22, after completion of the extraction processing of image data $D_{40}$ in a similar manner to that of the image data $D_{30}$.

The character recognition section 22 outputs the form-recognition information $E_{30}$ shown in FIG. 6(c) to the transaction control section 12 based on the following character recognition results, after recognition of characters in item image data included in the form recognition information $E_{30}$ input from the form recognition section 20 as shown in FIG. 6(a) through FIG. 6(c). In the character recognition processing, a dictionary file $F_d$ stored in a storage section 23 is referred to.

The above dictionary file $F_d$ is a file comprising number information, alphanumeric character information, and Chinese character information for conversion of number image data (for example, 1234567), alphanumeric character image data, and Chinese character image data (for example, Fujitsu Tarou), which are included in the item image data, into recognition characters (number, alphanumeric characters, and Chinese characters). For example, an item of "basic type" and that of "letter" are set for the number information shown in FIG. 6(b).

Standard hand-written-character image data (1, 2, 3, ... ) to be compared with the figure image data included in the item image data (refer to FIG. 6(a)) are defined in the item of "basic type". The above standard hand-written-character image data are image data corresponding to the numbers of a font (forms of characters) by which the character recognition rate is 100%. Here, the OCR-A font, the OCR-B font, the OCR-K font, and so on based on international standards and the JIS (Japanese Industrial Standard) standard are listed as a font for the standard hand-written-character.

And, recognition character data (1, 2, 3, ... ) corresponding to the standard, hand-written-character image data are defined in the item of "character". Here, in the dictionary file $F_d$, "character" and "basic type" are defined for other information such as alphanumeric character information and Chinese character information, respectively, in a similar manner to that of the number information.

And, the character recognition section 22 extracts the features of the character data included in the item image data, compares the feature parameters indicating the features with the standard hand-written-character image-data of the item "basic type" in the dictionary file $F_d$, and performs character recognition by selection of recognition characters as recognition results from the item "character" based on the comparison results. In addition, the section 22 outputs, for example, the form-recognition information $E_{30}$ shown in FIG. 6(c) to the transaction control section 12 after completion of character recognition processing.

The above character recognition information $F_{30}$ is information corresponding to the form-recognition information $E_{30}$ (refer to FIG. 6(a)), and information on "item", that on "attribute", that on "item image data", which are shown in FIG. 6(a), and "character recognition result" are related with each other by the information $F_{30}$. Here, the form recognition section 22 outputs the form-recognition information F40 with a similar data structure to that of the form-recognition information $F_{30}$ to the transaction control section 12, after the character recognition processing of the information recognition information $E_{40}$ in a similar manner to that of the form-recognition information $E_{30}$.

Returning to FIG. 1, a communication control section 24 is inserted between the transaction control section 12 and a network N, and controls communication with a host computer 70 connected to the network N according to a predetermined communication protocol. The above host computer 70 is set up in a center for management activities of customer information in a financial institution, and collectively manages the customer information such as account numbers, password numbers, customer's names, their addresses, and their balances. A storage section 71 has a function as a main storage device of the host computer 70, and stores a customer-information data base DB with regard to the customer information.

Then, the operation example 1 of the one embodiment will be described, referring to FIG. 7 through FIG. 12. The above operation example 1 will be described as one example for a case where notification of change of an address is performed, using the form 30a (refer to FIG. 2(a)) on which only predetermined formats are printed.

Figure 7:
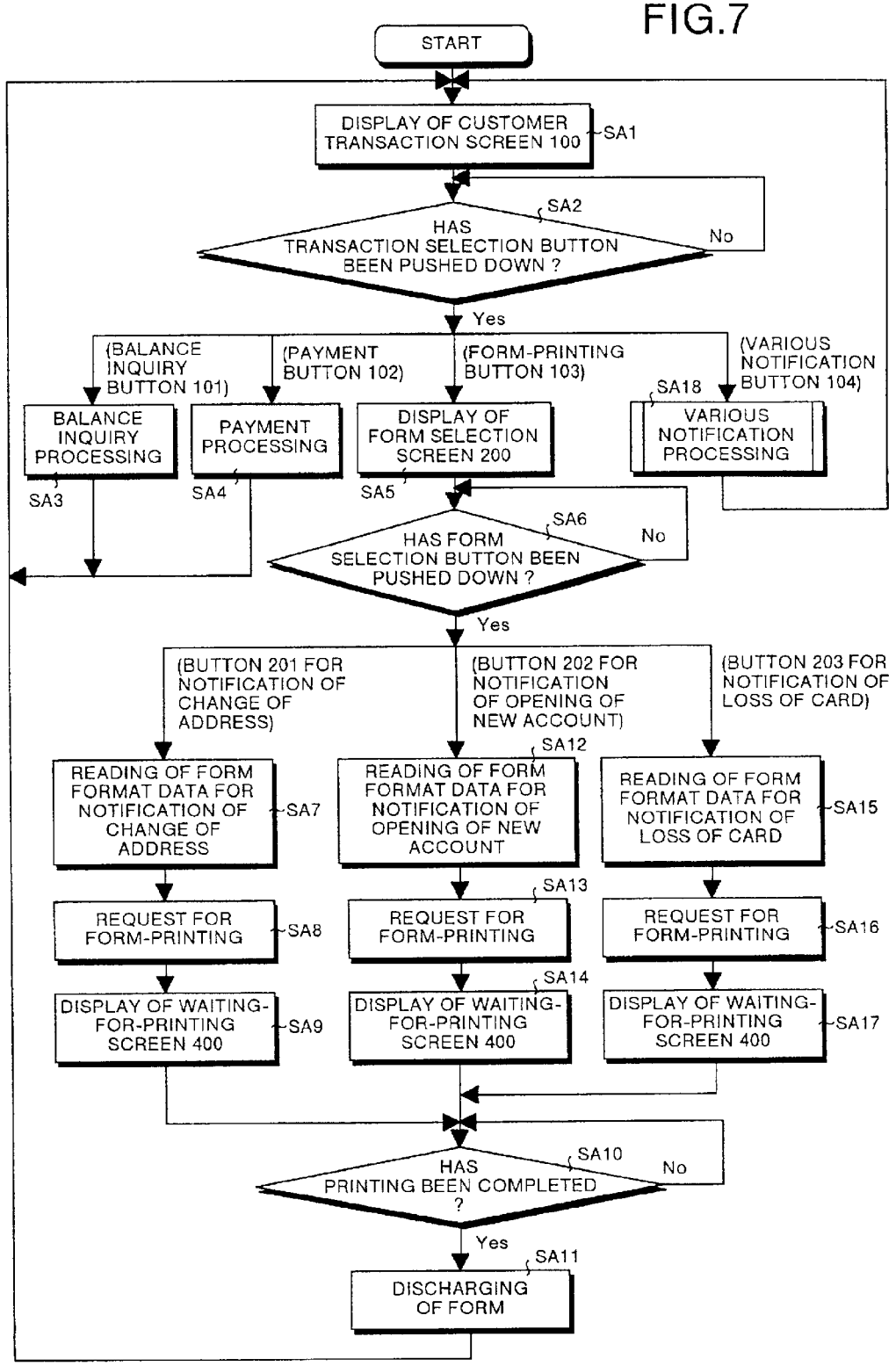
FIG. 7 is an explanatory flow chart of an operation example 1 of the one embodiment.

In FIG. 1, when the automatic transaction device 10 is started, the processing of the transaction control section 12 proceeds to a step SA2, after a customer transaction screen 100 (refer to FIG. 11(a)) is displayed on the display/input section 13 at a step SA1 shown in FIG. 7. The customer transaction screen 100 is a main menu screen for selection by a customer of one transaction among a plurality of transactions (balance inquiry, payment, form printing, and various kinds of notification).

A balance-inquiry button 101, a payment button 102, a form-printing button 103, and various-notification button 104 are displayed on the customer transaction screen 100, respectively. Here, functions of the balance-inquiry button 101 through the various-notification button 104 are realized by a display function of the display device in the display/input section 13, and an input function of the touch panel. Hereinafter, the balance-inquiry button 101 through the various-notification button 104 are known generically as transaction selection buttons.

At a step SA2, the transaction control section 12 decides whether a customer has pushed down the transaction selection button, and the decision is repeated, when the decision result is "No". In this case, when a customer pushes down the form-printing button 103 shown in FIG. 11(a), the processing of the transaction control section 12 proceeds to a step SA5, assuming that the decision result at the step SA2 is "Yes".

Here, when a customer pushes down the balance-inquiry button 101, the processing of the transaction control section 12 proceeds to a step SA3, assuming that the decision result at the step SA2 is "Yes". Then, balance inquiry processing for balance inquiry of the pertinent customer is performed. At completion of the balance-inquiry processing, the processing of the transaction control section 12 returns to the step SA1.

And, when a customer pushes down the payment button 102, the processing of the transaction control section 12 proceeds to a step SA4, assuming that the decision result at the step SA2 is "Yes", and payment processing to pay cash is executed. At completion of the payment processing, the processing of the transaction control section 12 returns to the step SA1.

In this case, the processing of the transaction control section 12 proceeds to a step SA6, after a form selection screen 200 shown in FIG. 11(b) is displayed on the display/input section 13 at the step SA5. The above form selection screen 200 is a screen for selection by a customer of one form to be made from a plurality of forms (a form for notification of change of an address, one for notification of opening of a new account, and one for notification of loss of a card).

Specifically, a button 201 for notification of change of an address in order to select a form for notification of change of an address (the form 30a: refer to FIG. (a)), a button 202 for notification of opening of a new account in order to select a form for notification of opening of a new account, and a button 203 for notification of loss of a card in order to select a form for notification of loss of a new card are displayed on the form selection screen 200, respectively. Hereinafter, the button 201 for notification of change of an address through the one 203 for notification of loss of a card are known generically as form selection buttons.

At a step SA6, the transaction control section 12 decides whether a customer has pushed down the form selection button, and the decision is repeated, when the decision result is "No". In this case, when a customer pushes down the button 201 for notification of change of an address shown in FIG. 11(b), the processing of the transaction control section 12 proceeds to a step SA7, assuming that the decision result at the step SA6 is "Yes".

After the transaction control section 12 reads the form format-data for notification of change of an address from the storage section 19 at a step SA7, the processing of the section 12 proceeds to a step SA8. After the transaction control section 12 outputs the form format-data to the form-printing control section 17, and, at the same time, gives a request for form-printing to the form-printing control section 17 at the step SA8, the processing of the section 12 proceeds to a step SA9. Thereby, the form-printing control section 17 controls the printing section 14 for starting to print the form 30a shown in FIG. 2(a).

The processing of the transaction control section 12 proceeds to a step SA10, after awaiting-for-printing screen 400 shown in FIG. 11(d) is displayed on the display/input section 13 at the step SA9. A message saying "Now, under printing. . . . Please can you wait?" for giving an instruction for waiting to a customer is displayed on the waiting-for-printing screen 400. At a step SA10, the transaction control section 12 decides, based on the printing-completion signal from the form-printing control section 17, whether the printing has been completed, and the decision is repeated in the present case, assuming that the decision result is "No".

At completion of the printing, the form-printing control section 17 outputs a printing completion signal to the transaction control section 12. Thereby, the processing of the transaction control section 12 proceeds to a step SA11, assuming that the decision result at the step SA10 is "Yes". After the transaction control section 12 gives an instruction of discharging of forms to the form-printing control section 17 at the step SA11, and the processing of the section 12 returns to the step SA1.

Thereby, the printing section 14 discharges the form 30a (refer to FIG. 2(a)) from the form-discharging slot 11a to the outside, based on control by the form-printing control section 17. After receiving the discharged form 30a, the customer makes the entered form 30b by entry, by hand, of the account number $D_1$ through the new address $D_4$ into the account-number entry frame 31a through the new-address entry frame 34a, respectively, as shown in FIG. 2(b).

And, the processing of the transaction control section 12 proceeds to the step SA2, after the customer transaction screen 100 (refer to FIG. 11(a)) is displayed on the display/input section 13 at a step SA1, the section 12 decides whether the transaction selection button has been pushed down or not, and the decision is repeated, when the decision result is "No".

On the other hand, when a customer pushes down the button 202 for notification of opening of a new account shown in FIG. 11(b), the processing of the transaction control section 12 proceeds to a step SA12, assuming that the decision result at the step SA6 is "Yes". Thereafter, operations for making forms for notification of opening of a new account are performed at the steps SA12 through SA14, the step SA10, and the step SA11 in a similar manner to the operations to make the forms 30a for notification of change of an address.

That is, the form format-data for notification of opening of a new account are read from the storage section 19 at the step SA12, and printing of the forms for notification of opening of a new account is started at the step SA13 by a request for printing of forms to the form-printing control section 17. The waiting-for-printing screen 400 (refer to FIG. 11(d)) is displayed on the display/input section 13 at the subsequent step SA14. And, the decision result at the step SA10 becomes "Yes" at completion of printing of forms for notification of opening of a new account, and, then, forms for notification of opening of a new account are discharged from the form-discharging slot 11a at the step SA11.

In the same way, when a customer pushes down the button 203 for notification of loss of a card shown in FIG. 11(b), the processing of the transaction control section 12 proceeds to a step SA15, assuming that the decision result at the step SA6 is "Yes". Thereafter, operations for making forms for notification of change of an address are performed at the steps SA15 through SA17, the step SA10, and the step SA11 in a similar manner to the operations to make the forms 30a for notification of change of an address.

That is, the form format-data for notification of loss of a card are read from the storage section 19 at the step SA15, and printing of the form for notification of loss of a card is started at the step SA16 by a request for printing of forms to the form-printing control section 17. The waiting-for-printing screen 400 (refer to FIG. 11(d)) is displayed on the display/input section 13 at the subsequent step SA17. And, the decision result at the step SA10 becomes "Yes" at completion of printing of forms for notification of loss of a card, and, then, forms for notification of loss of a card are discharged from the form-discharging slot 11a at the step SA11.

Figure 8:
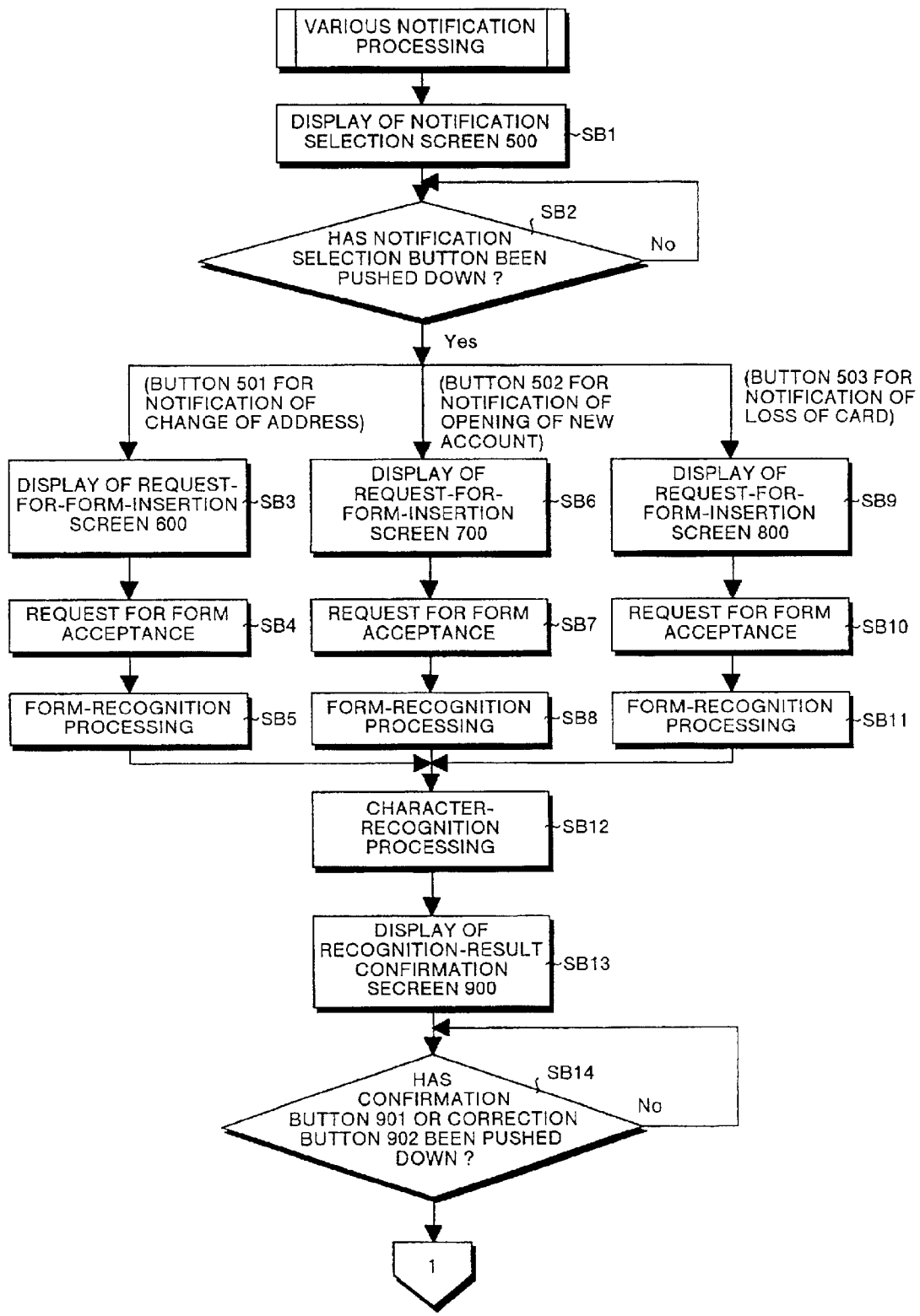
FIG. 8 is an explanatory flow chart of various kinds of notification operations shown in FIG. 7.
Figure 9:
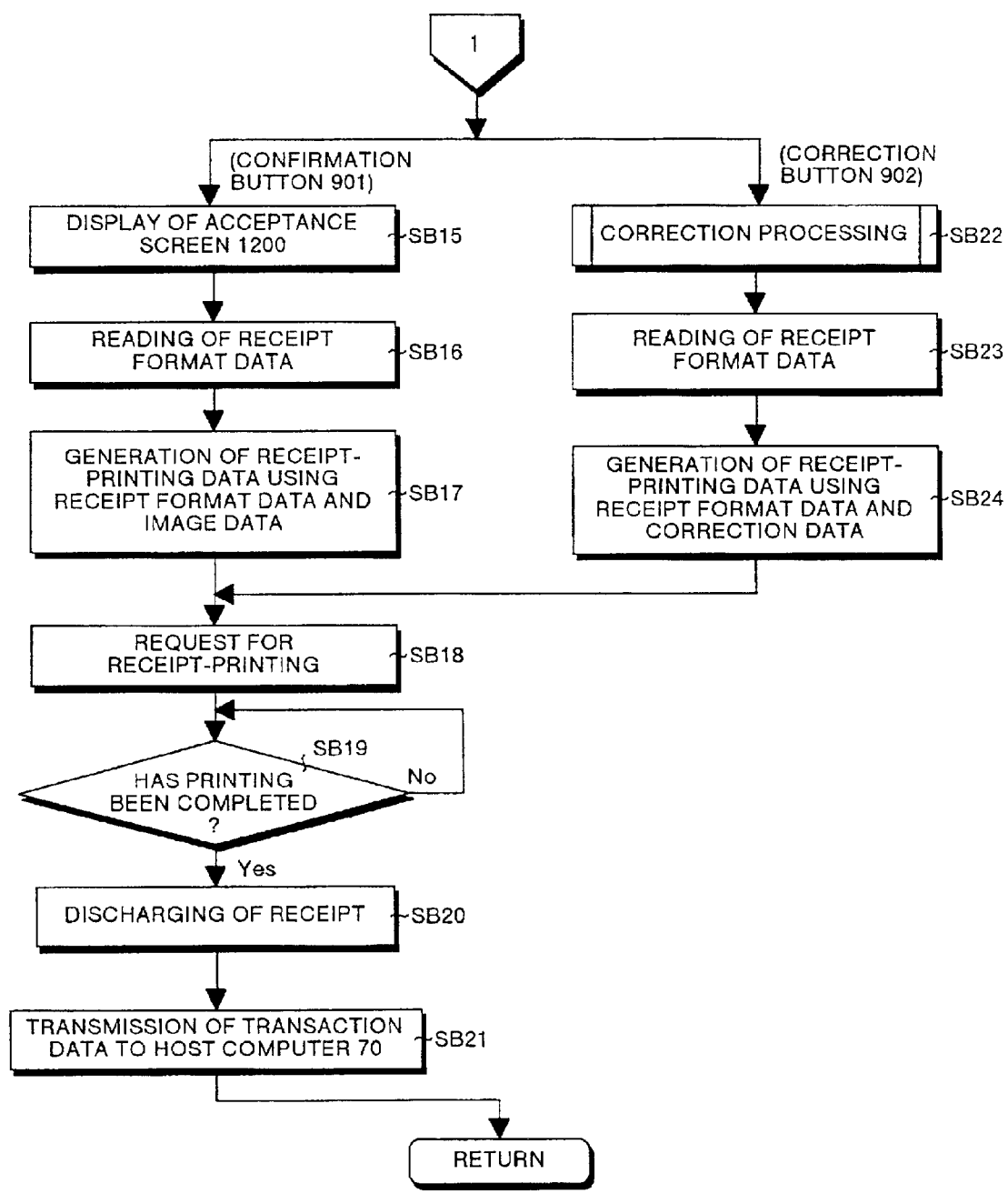
FIG. 9 is another explanatory flow chart of various kinds of notification operations shown in FIG. 7.

And, when a customer pushes down the various-notification button 104 shown in FIG. 11(a), the processing of the transaction control section 12 proceeds to a step SA18, assuming that the decision result at the step SA2 is "Yes", and various kinds of notification processing shown in FIG. 8, and FIG. 9 are executed.

That is, the processing of the transaction control section 12 proceeds to a step SB2, after a notification selection screen 500 (refer to FIG. 11(e)) is displayed on the display/input section 13 at a step SB1 shown in FIG. 8. The above notification selection screen 500 is a screen for selection by a customer of one piece of notification to be made from plural piece of notification (notification of change of an address, that of opening of a new account, and that of loss of a card).

Specifically, a button 501 for notification of change of an address in order to select notification of change of an address, a button 502 for notification of opening of a new account in order to select notification of opening of a new account, and a button 503 for notification of loss of a card in order to select notification of loss of a new card are displayed on the notification selection screen 500, respectively. Hereinafter, the button 501 for notification of change of an address through the one 503 for notification of loss of a card are known generically as notification selection buttons.

At the step SB2, the transaction control section 12 decides whether a customer has pushed down the notification selection button, and the decision is repeated, when the decision result is "No". In the present case, a customer pushes down the button 501 for notification of change of an address shown in FIG. 11(e), in order to perform notification of change of an address, using the entered form 30b for notification of change of an address shown in FIG. 2(b). Thereby, the processing of the transaction control section 12 proceeds to a step SB3, assuming that the decision result at the step SB2 is "Yes".

The processing of the the transaction control section 12 proceeds to a step SB4, after a form-insertion instruction screen 600 shown in FIG. 11(f) is displayed on the display/input section 13 at the step SB3. A message saying "Please, can you insert an entered form for notification of change of an address?" for giving an instruction to insert the entered form 30b into the card inserting slot is displayed on the form-insertion instruction screen 600.

The transaction control section 12 gives a request for accepting of forms to the image-reading 15 at the step SB4. Then, the customer inserts the entered form 30b (refer to FIG. 11(b)) to the form inserting slot 11b after visual confirmation of the form-insertion instruction screen 600. Thereby, the image reading section 15 optically reads the images on the inserted entered-form 30b in lines, and outputs the read results to the form recognition section 20 as image data $D_{30}$ (refer to FIG. 5(a)).

Thereby, the section 20 executes the form recognition processing at a step SB5. That is, the form recognition section 20 reads information on the form for notification of change of an address in the OCR definition file FO from the storage section 21 shown in FIG. 5(b), after recognition of the form for notification of change of an address as the kind of the read form. Then, the form recognition section 20 makes the form-recognition information $E_{30}$ shown in FIG. 5(c), based on the item image data after extraction of item image data from the image data $D_{30}$ referring to the form for notification of change of an address. Thereafter, the form recognition section 20 outputs the form-recognition information $E_{30}$ to the character recognition section 22.

Thereby, the section 22 executes the character-recognition processing at a step SB12, based on the form-recognition information $E_{30}$ (refer to FIG. 6(a)) and the dictionary file $F_d$ (refer to FIG. 6(b)). That is, the character recognition section 22 reads the dictionary file $F_d$ from the storage section 23 shown in FIG. 6(b) Subsequently, the section 22 compares in lines the item image data in the form-recognition information $E_{30}$ shown in FIG. 6(a) with the standard hand-written-character image-data of the item "basic type" in the dictionary file $F_d$, and performs character recognition based on the comparison results. Then, at completion of the character recognition of all the item image data, the character recognition section 22 makes the character-recognition information $F_{30}$ shown in FIG. 6(c), and outputs the information $F_{30}$ to the transaction control section 12.

Here, it should be noticed that there are found to be characters, which are different each other in the following comparison, in the character-recognition information $F_{30}$ after comparison of the "item image data" (1234567) in the item "account"with "character-recognition result" (2234567) corresponding to the image data. Specifically, "1" of the seventh digit in "item image data", and "2" of the seventh digit in "character recognition result" are different each other. In a word, the hand-written character "1" has been mis-recognized as "2" owing to blurs of hand-written characters, disorders of character shapes, and so on in the present case.

In the same way, there are found to be characters which are different each other when the "item image data" (4-5-6, Aka-machi, Takasaki-shi, Gumma-Pref.) in the item "new address" is compared with "character-recognition result" (1-2-3, Aka-machi, Takasaki-shi, Gumma-Pref.). Specifically, "4-5-6" in "item image data", and "1-2-3" in "character recognition result" are different each other.

And, the processing of the transaction control section 12 proceeds to the step SB14, after a recognition-result confirmation screen 900 shown in FIG. 12(a) is displayed on the display/input section 13 at the step SB13, based on the character-recognition information $F_{30}$. The above recognition-result confirmation screen 900 is a screen for confirmation by a customer of the character-recognition results by the character recognition section 22. Specifically, a piece of information (the contents which you have notified . . . Please can you push down the correction button?), character-recognition results (refer to FIG. 6(c)) every item (account number, name, old address, and new address), a confirmation button 901 and a correction button 902 are displayed on the recognition-result confirmation screen 900.

The above confirmation button 901 is pushed down by a customer, when there is no error in the character-recognition results, and the correction button 902 is pushed down by the customer, when there is an error in the character-recognition results.

At the step SB14, the transaction control section 12 decides whether the confirmation button 901 or the correction button 902, which are shown in FIG. 12(a), has been pushed down, and the decision is repeated in the present case, assuming that the decision result is "No". Then, a customer decides, by visual confirmation of the recognition-result confirmation screen 900 shown in FIG. 12(a), whether the character-recognition results are in coincidence with characters entered by the customer into the form 30a. In the present case, there is a difference, as described above, between "2" of the seventh digit in the item "account number", and "1" which has been actually entered. Moreover, there is also a difference between characters of "1-2-3" in the item "old address", and those of "4-5-6" which have been actually entered. Accordingly, in the present case, the customer pushes down the correction button 902 in order to correct the error.

Thereby, the processing of the transaction control section 12 proceeds to a step SB22 shown in FIG. 9, assuming that the decision result at the step SB14 is "Yes", and correction processing (refer to FIG. 10) is executed. That is, the processing of the transaction control section 12 proceeds to a step SC2, after a correction-item selection screen 1000 shown in FIG. 12(b) is displayed on the display/input section 13 at a step SC1 shown in FIG. 10. The above correction-item selection screen 1000 is a screen for selection by a customer of an item to be corrected from a plurality of items (account number, name, old address, and new address).

Specifically, an account-number button 1001 for selection of the item "account number", a name button 1002 for selection of the item "name", an old-address button 1003 for selection of the item "old address", a new-address button 1004 for selection of the item "new address", and an completion-of-all-corrections button 1005 which is pushed down at completion of all the corrections are displayed on the correction-item selection screen 1000, respectively.

In addition, the character-recognition results are displayed at the lower positions, and the item image data at the upper one of the right side of the account-number button 1001 through the new address button 1004, respectively, as one set of data on the correction-item selection screen 1000. Hereinafter, the account-number button 1001 through the new-address one 1004 are known generically as item selection buttons.

At the step SC2, the transaction control section 12 decides whether the item selection button has been pushed down, and the decision is repeated in the present case, assuming that the decision result is "No". Then, a customer decides, by visual confirmation of the correction-item selection screen 1000 shown in FIG. 12(b), whether there is an error in the character-recognition. In the present case, there are errors in the character-recognition result (2234567) displayed on the right side of the account number button 1001, and in the character-recognition result (1-2-3, Aka-machi, Takasaki-shi, Gumma-Pref.) displayed on the right side of the new-address button 1004. Accordingly, in the first place, the customer pushes down the account-number button 1001 in order to correct the character-recognition result for the item "account number".

Thereby, the processing of the transaction control section 12 proceeds to a step SC3, assuming that the decision result at the step SC2 is "Yes". The processing of the transaction control section 12 proceeds to a step SC4, after a correction screen 1100 shown in FIG. 12(c) is displayed on the display/input section 13 at the step SC3. The above correction screen 1100 is a screen for correction of the account numbers for which improper character-recognition has been made.

Specifically, the item data (1234567) corresponding to the characters actually entered by the customer are displayed on the right side of the item "entry data", and the character-recognition result (2234567) by the character-recognition section 22 are done on the right side of the item "recognition result" in the correction screen 1100. And, there are displayed, on the correction screen 1100, input keys 1102 for input of character data such as numbers of "0" through "9", Japanese cursive syllabaries of "A" which is equivalent to "A" of the alphabets, through "N" which is equal to "Z" of the alphabets, and the alphabets of "A" through "Z".

Here, in the case of input of the Chinese characters, only use of a conversion key (not shown) for conversion of the syllabaries to the Chinese characters may be required after input of the Japanese cursive syllabaries with the input keys 1102. In addition, a correction-completion button 1103, which is pushed down at completion of correction of the account numbers, is displayed on the correction screen 1100.

At the step SC4, the transaction control section 12 decides whether the input keys 1102 have been pushed down, and the decision is repeated in the present case, assuming that the decision result is "No". Then, a customer sequentially pushes down keys corresponding to a correct account number among input keys 1102 of number keys "0" through "9", based on the correction screen 1100 shown in FIG. 12(c). In a word, in the present case, the customer inputs a correct account number comprising "1234567", using the input keys 1102.

Figure 12:
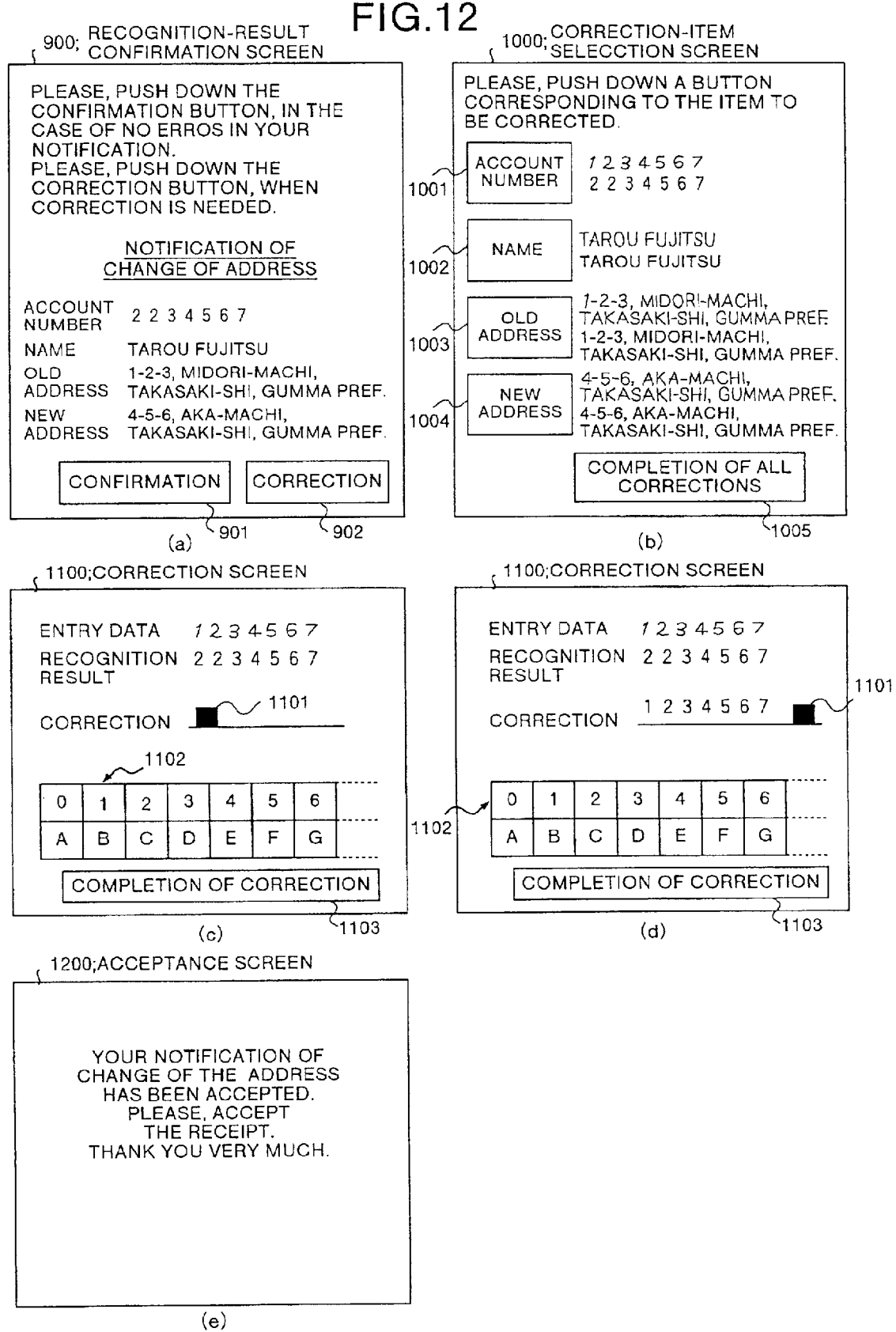
FIG. 12 is another view showing examples of display screens in a display/input section 13 shown in FIG. 1.

And, when the input keys 1102 are pushed down, the processing of the transaction control section 12 proceeds to a step SC5, assuming that the decision result at the step SC4 is "Yes", and the input data (number data in the present case) are displayed on the right side of the item "correction" shown in FIG. 12. Thereafter, the processing proceeds to a step SC6. At the step SC6, the transaction control section 12 decides whether the correction-completion key 1103 has been pushed down, and the processing of the section 12 returns to the SC4 in the present case, assuming that the decision result is "No".

Thereafter, input data are sequentially displayed at the SC5, whenever the input keys 1102 are pushed down. At this time, a cursor 1101 is moved to the right. Then, the correct account number "1234567" is displayed on the right side of the item "correction", as shown in FIG. 12(d), when all the numbers for a correct account-number are input.

Here, when a customer pushes down the correction-completion key 1103, the processing of the transaction control section 12 proceeds to a step SC10, assuming that the decision result at the step SC6 is "Yes", after the correction-item selection screen 1000 shown in FIG. 12(b) is displayed again on the display/input section 13. At the step SC10, the transaction control section 12 decides whether the completion-of-all-corrections button 1005 has been pushed down, and the processing of the section 12 returns to the SC2 in the present case, assuming that the decision result is "No".

At the step SC2, the transaction control section 12 decides in a similar manner to those of the operations whether the item selection button has been pushed down. Here, a customer pushes down the new-address button 1004 in order to correct the character recognition result for the item "new address", as there is an error in the recognition result (1-2-3, Aka-machi, Takasaki-shi, Gumma-Pref.) shown on the right side of the new-address button 1004 shown in FIG. 12(b).

Thereby, the processing of the transaction control section 12 proceeds to a step SC9, assuming that the decision result at the step SC2 is "Yes". At the step SC9, the transaction control section 12 performs correction processing for a new address in a similar manner to the processing of the steps SC4 through SC6. In the correction processing, a correction screen for correction of a new address is displayed in a similar manner to that of the correction screen 1100 shown in FIG. 12(c), and correction of a new address is performed according to characters which are input with the input keys (not shown). Then, when a customer pushes down a correction-completion key (not shown), the processing of the transaction control section 12 proceeds to the step SC10, after the correction-item selection screen 1000 shown in FIG. 12(b) is displayed on the display/input section 13.

At the step SC10, the transaction control section 12 decides whether the completion-of-all-corrections button 1005 (refer to FIG. 12(b)) has been pushed down. In the present case, a customer pushes down the completion-of-all-corrections button 1005, as all the corrections have been completed.

Thereby, the processing of the transaction control section 12 returns to a routine for notification processing shown in FIG. 9, assuming that the decision result at the step SC10 is "Yes".

Here, when the name button 1002 shown in FIG. 12(b) is pushed down, the processing of the transaction control section 12 proceeds to a step SC7, assuming that the decision result at the step SC2 is "Yes". After correction processing for a name is executed at the step SC7 in a similar manner to that of the correction one for a new address (step SC9), the processing of the transaction control section 12 proceeds to the step SC10.

Figure 10:
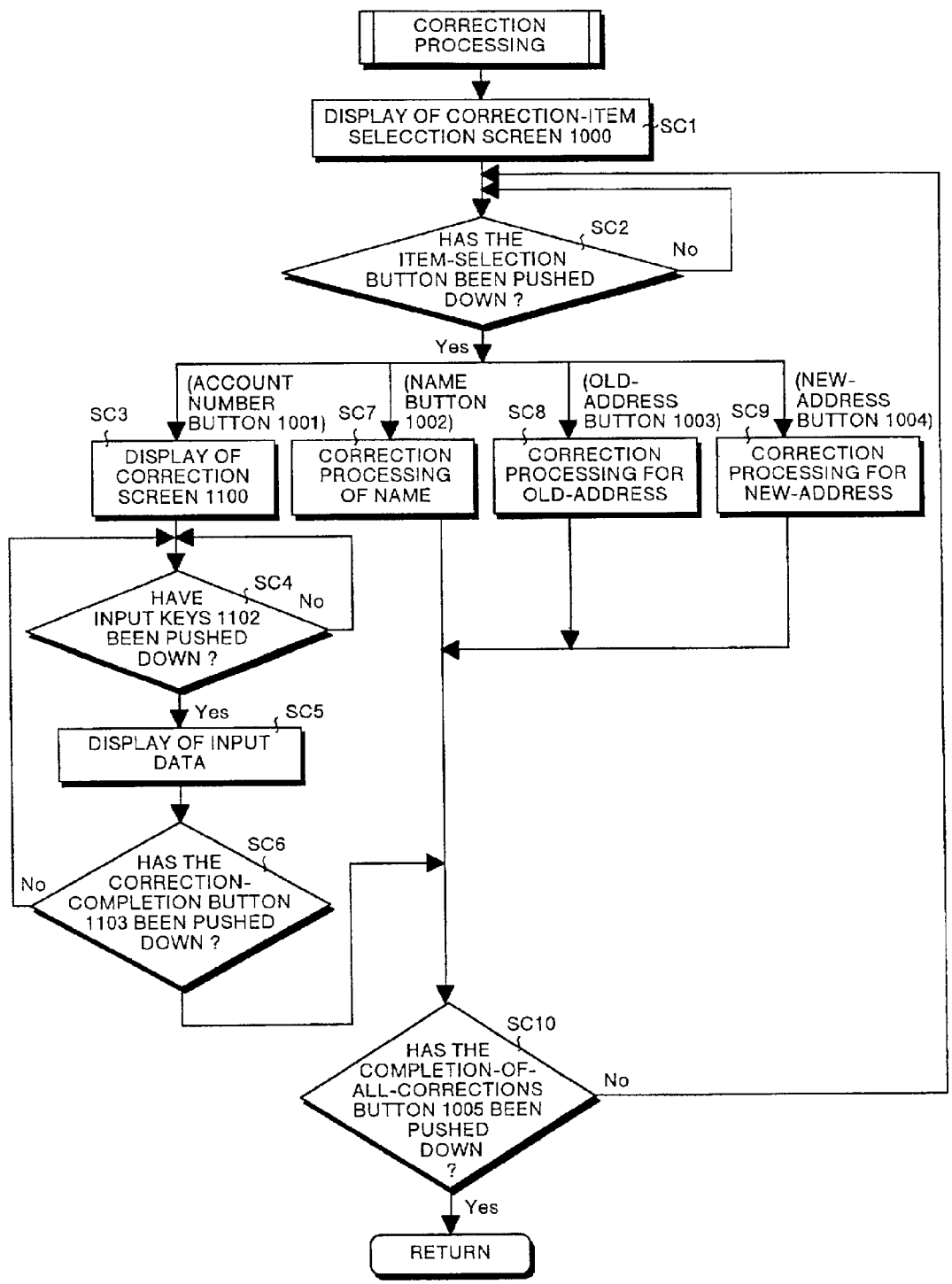
FIG. 10 is an explanatory flow chart of correction operation shown in FIG. 9.
Figure 11:
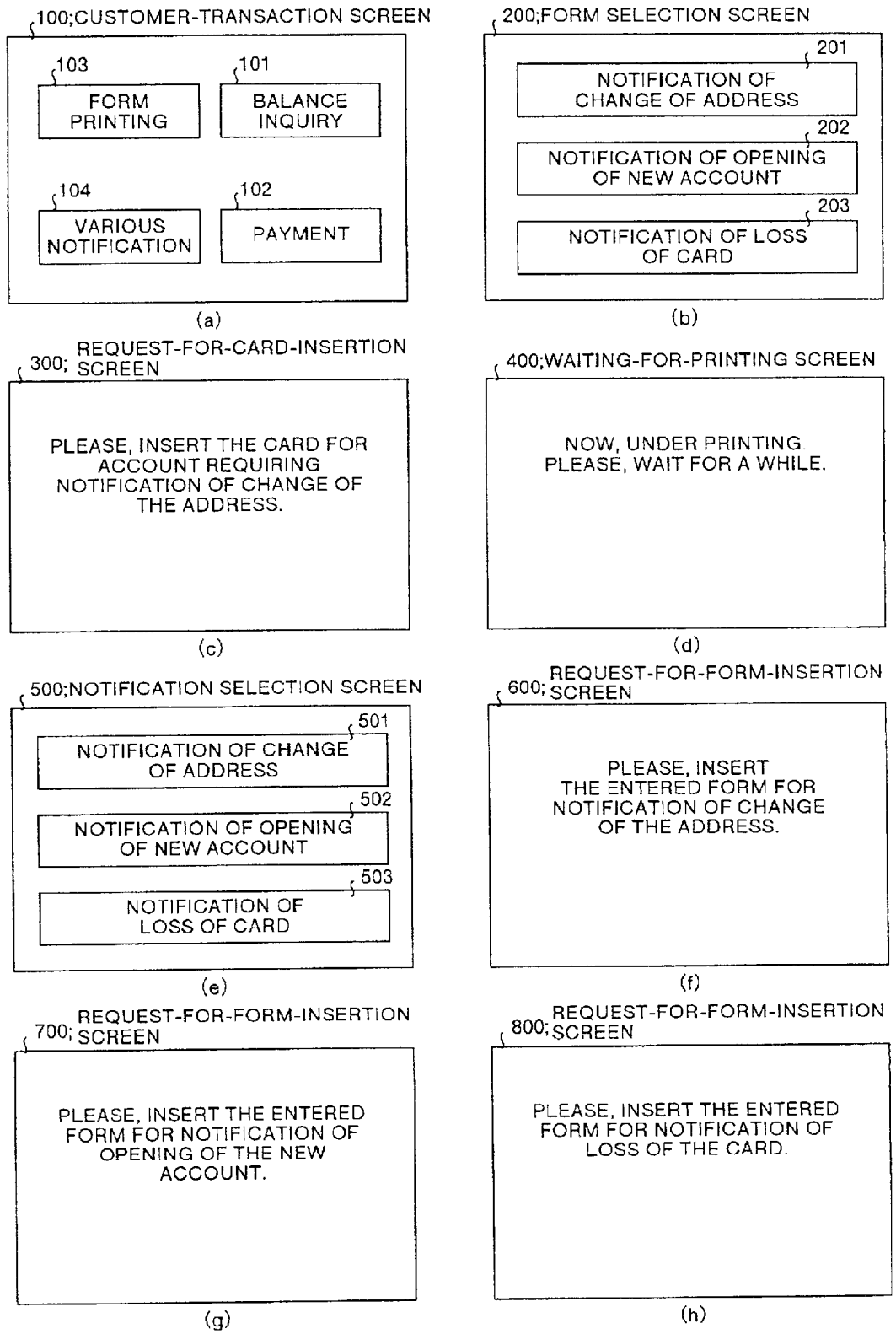
FIG. 11 is a view showing examples of display screens in a display/input section 13 shown in FIG. 1.

And, when the old-address button 1003 shown in FIG. 12(b) is pushed down, the processing of the transaction control section 12 proceeds to a step SC8, assuming that the decision result at the step SC2 is "Yes" shown in FIG. 10. After the correction processing for a old-address is executed at the step SC8 in a similar manner to that of the correction one for a new address (step SC9), the processing of the transaction control section 12 proceeds to the step SC10.

In the present case, after an acceptance screen 1200 (refer to FIG. 12(e)) is displayed on the display/input section 13, and at the same time, an receipt format-data for notification of change of an address are read from the storage section 19 at a step SB23 shown in FIG. 9, the processing of the transaction control section 12 proceeds to a step SC24. In the present case, after receipt-printing data are made at the step SB24, using the image data $D_{30}$ on which the receipt format-data and data corrected at the step SB22 are reflected, the processing of the transaction control section 12 proceeds to a step SC18.

After the receipt-printing data are output to a receipt-printing control section 18, and at the same time, a request for receipt printing is made to the section 18 at a step SB18, the processing of the transaction control section 12 proceeds to a step SC19. Thereby, the receipt-printing control section 18 controls the printing section 14 for starting to print the receipt 50 shown in FIG. 4.

At a step SB19, the transaction control section 12 decides, based on the printing-completion signal from the receipt-printing control section 18, whether printing has been completed, and the decision is repeated in the present case, assuming that the decision result is "No".

Then, the receipt-printing control section 18 outputs the printing-completion signal to the transaction control section 12 at completion of printing. Thereby, the processing of the transaction control section 12 proceeds to a step SB20, assuming that the decision result at the step SB19 is "Yes". At the step SB20, the transaction control section 12 gives an instruction for discharging of the receipt 50 to the receipt-printing control section 18. Thereby, the printing section 14 discharges the receipt 50 (refer to FIG. 4) from the form-discharging slot 11a to the outside, based on control by the receipt-printing control section 18. A customer receives the discharged receipt 50. At this time, the receipt 50 has an account number and a new address which are corrected by the correction processing.

After the transaction data for notification of change of an address is transmitted to a host computer 70 through the communication control section 24 and the network N at a step SB21, the transaction control section 12 completes various kinds of notification processing, and processing of the section 12 returns to the step SA1 shown in FIG. 7. When the host computer 70 receives the transaction data, the transaction data are reflected on the customer-information data base DB.

On the other hand, a customer pushes down the confirmation button 901, when all characters are correctly recognized on the recognition-result confirmation screen 900 shown in FIG. 12(a). Thereby, the processing of the transaction control section 12 proceeds to a step SB15 shown in FIG. 9, assuming that the decision result at the step SB14 shown in FIG. 8 is "Yes". After the acceptance screen 1200 shown in FIG. 12(e) is displayed on the display/input section 13 at the SB15, the processing of the transaction control section 12 proceeds to a step SB16. After the receipt format-data for notification of change of an address are read at the step SB16, the processing of the transaction control section 12 proceeds to a step SB17.

After receipt-printing data are made at the step SB17, using the receipt format-data, and the image data $D_{30}$ input from the image reading section 15, the processing of the transaction control section 12 proceeds to the step SC18. After the receipt-printing data are output to the receipt-printing control section 18, and, at the same time, a request for receipt printing is made to the section 18 at the step SB18, the processing of the transaction control section 12 proceeds to the step SC19. Thereby, the receipt-printing control section 18 controls the printing section 14 for starting to print the receipt 50 shown in FIG. 4.

At the step SB19, the transaction control section 12 decides, based on the printing-completion signal from the receipt-printing control section 18, whether printing has been completed. Then, the receipt-printing control section 18 outputs the printing-completion signal to the transaction control section 12 at completion of printing. Thereby, the processing of the transaction control section 12 proceeds to the step SB20, assuming that the decision result at the step SB19 is "Yes".

At the step SB20, the transaction control section 12 gives an instruction for discharging of the receipt 50 to the receipt-printing control section 18. Thereby, the printing section 14 discharges the receipt 50 (refer to FIG. 4) from the form-discharging slot 11a to the outside, based on control by the receipt-printing control section 18. A customer receives the discharged receipt 50. At this time, the receipt format-data and the image data $D_{30}$ are printed on the receipt 50.

After the transaction data for notification of change of an address is transmitted to the host computer 70 through the communication control section 24 and the network N at the step SB21 in a similar manner to those of the operations, the transaction control section 12 completes various kinds of notification processing, and processing of the section 12 returns to the step SA1 shown in FIG. 7.

On the other hand, when a customer pushes down the button 202 for notification of opening of a new account on the form-selection screen 200 shown in FIG. 11(b), the processing of the transaction control section 12 proceeds to the step SA12, assuming that the decision result at the step SA6 is "Yes". After the form format-data for notification of change of an address are read from the storage section 19 at the step SA12, the processing of the transaction control section 12 proceeds to the step SA13.

After the form format-data are output to the form-printing control section 17, and, at the same time, a request for form printing is made to the section 17 at the step SA13, the processing of the transaction control section 12 proceeds to the step SA14. Thereby, the form-printing control section 14 controls the printing section 14 for starting to print a form for notification of change of a new address (not shown).

After the waiting-for-printing screen 400 shown in FIG. 11(d) is displayed on the display/input section 13 at the step SA14, the processing of the transaction control section 12 proceeds to the step SA10. Then, the processing of the form-printing control section 17 proceeds to the step SA11, assuming that the decision result at the step SA10 is "Yes", when the printing is completed. After the transaction control section 12 gives an instruction for discharging of a form for notification of change of a new address to the form-printing control section 17, processing of the section 12 returns to the step SA1.

And, when a customer pushes down the button 203 for notification of loss of a card on the form-selection screen 200 shown in FIG. 11(b), the processing of the transaction control section 12 proceeds to the step SA15, assuming that the decision result at the step SA6 is "Yes".

After the form format-data for notification of loss of a new card are read from the storage section 19 at the step SA15, the processing of the transaction control section 12 proceeds to the step SA16. After the form format-data are output to the form-printing control section 17, and, at the same time, a request for form printing is made to the section 17 at the step SA16, the processing of the transaction control section 12 proceeds to the step SA17. Thereby, the form-printing control section 17 controls the printing section 14 for starting to print a form for notification of loss of a card (not shown).

After the waiting-for-printing screen 400 shown in FIG. 11(d) is displayed on the display/input section 13 at the step SA17, the processing of the transaction control section 12 proceeds to the step SA10. Then, the processing of the form-printing control section 17 proceeds to the step SA11, assuming that the decision result at the step SA10 is "Yes", when the printing is completed. After the transaction control section 12 gives an instruction for discharging of a form for notification of loss of a card to the form-printing control section 17 at the step SA11, processing of the section 12 returns to the step SA1.

Now, though an example where forms 30a, on which only a predetermined formats are printed, are made, has been described as shown in FIG. 2(a) in the operation example 1, forms 40a, on which an account number $P_1$, a name $P_2$, and an old address $P_3$, as well as the predetermined formats, are printed as shown in FIG. 3(a), may be made.

Figure 13:
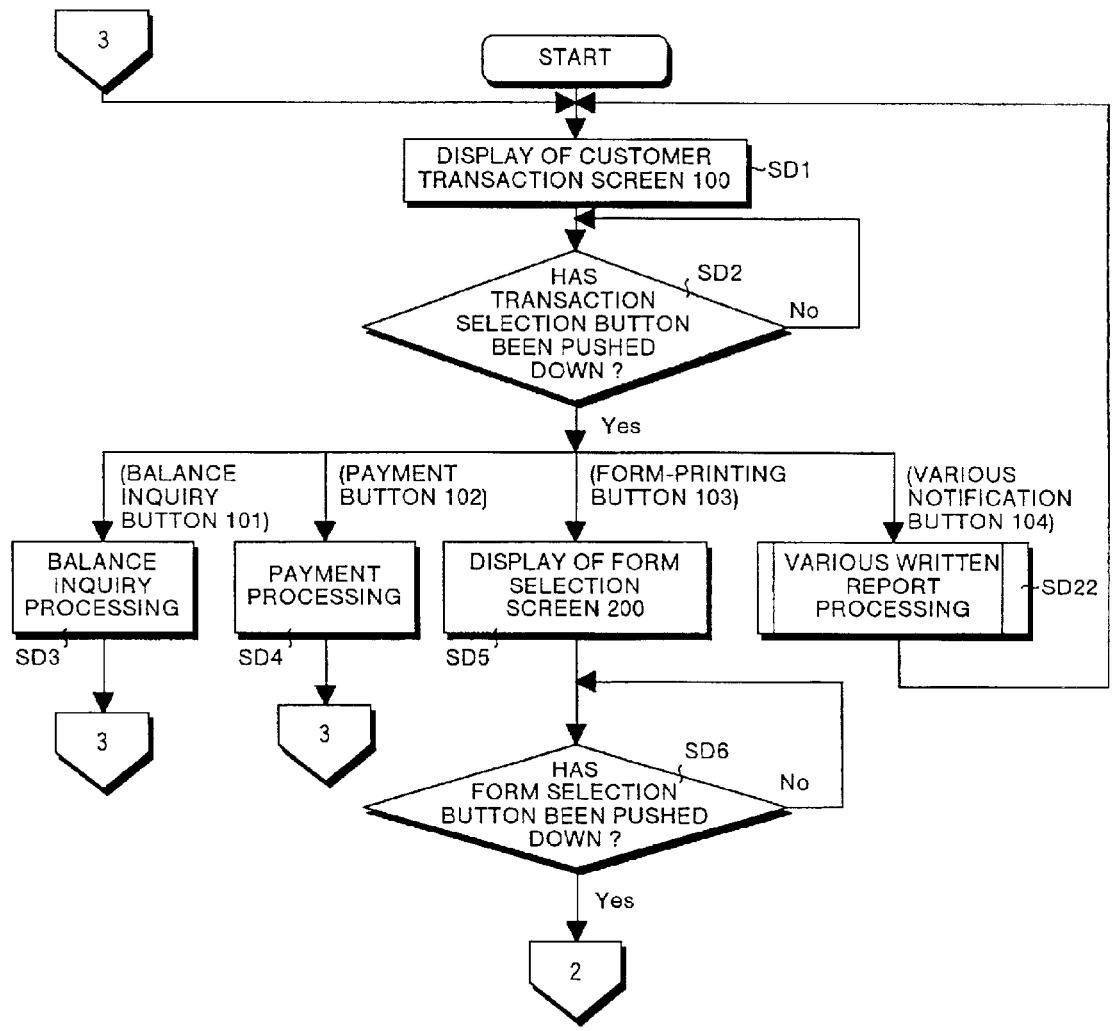
FIG. 13 is an explanatory flow chart of an operation example 2 of the one embodiment.
Figure 14:
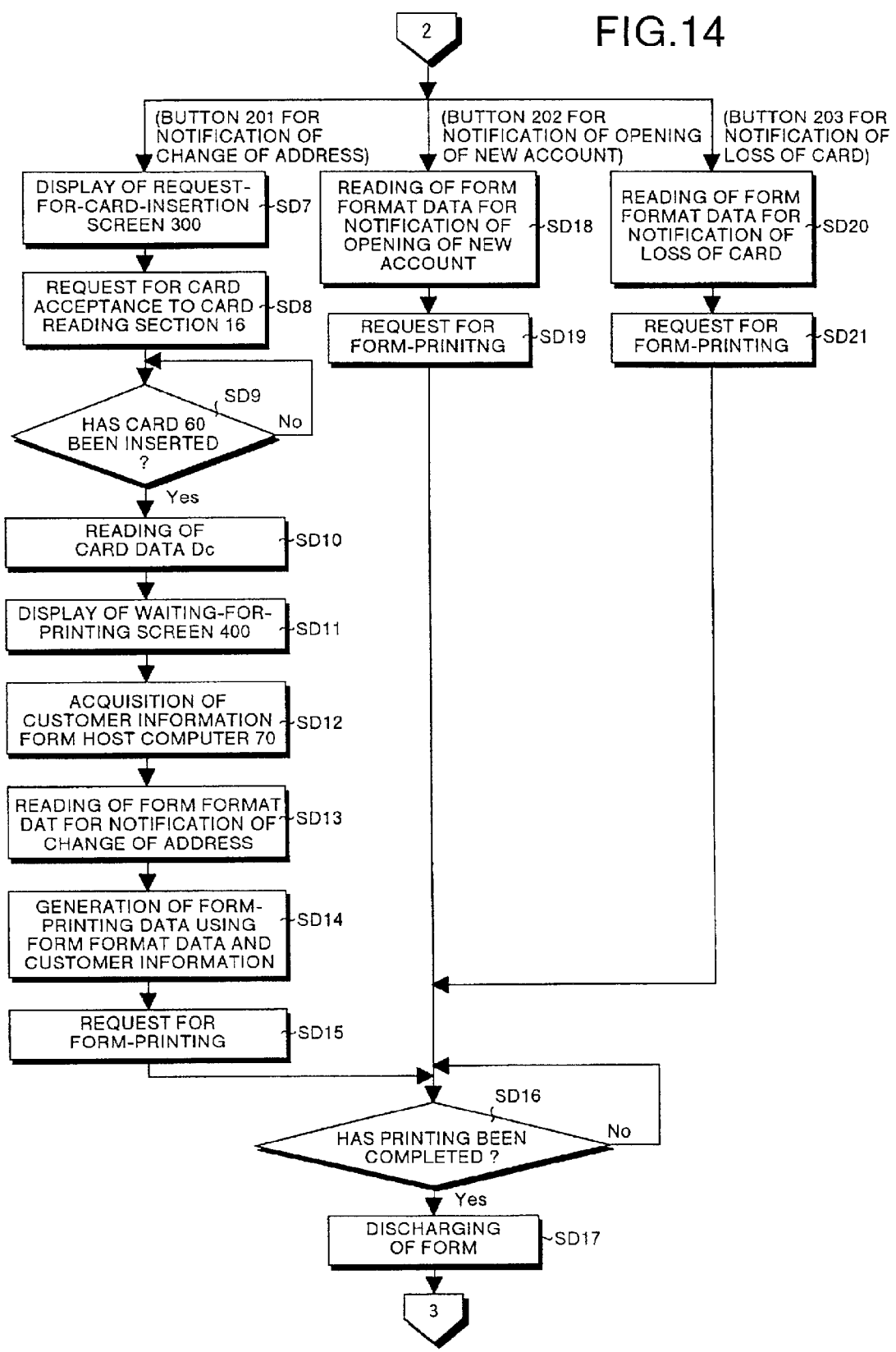
FIG. 14 is another explanatory flow chart of an operation example 2 of the one embodiment.

Hereinafter, operations in the case will be described as an operation example 2, referring to the flow charts shown in FIG. 13, and FIG. 14. Here, operations at the steps SD1 through SD6, the step SD22, and the steps SD18 through SD21, which are shown in FIG. 13 and FIG. 14, are performed in a similar manner to those of the steps SA1 through SA6, and the steps SA18, SA12, SA13, SA15, and SA16, which are shown in FIG. 7. Therefore, operations at the steps SD7 through SD15, will be described in detail in the operation example 2.

In the present case, under a state where the form-selection screen 200 shown in the FIG. 11(b) is displayed on the display/input section 13, the transaction control section 12 decides at the step SD6 shown in FIG. 13 whether a customer has pushed down the form-selection button, and the decision is repeated, when the decision result is "No". In this case, when a customer pushes down the button 201 for notification of change of an address, the processing of the transaction control section 12 proceeds to the step SD7 shown in FIG. 14, assuming that the decision result at the step SD6 is "Yes".

After a card-insertion instruction screen 300 shown in FIG. 11(c) is displayed on the display/input section 13 at the step SD7, the processing of the transaction control section 12 proceeds to a step SD8. The above card-insertion instruction screen 300 is a screen to give a customer instruction to insert the card 60, which is for an account requiring change of an address, into the card inserting slot 11c. At the step SD8, the transaction control section 12 makes a request for start of acceptance of the card to the card reading section 16.

At the subsequent step SD9, the card reading section 16 decides whether the card 60 has been inserted into the card inserting slot 11c, and the decision is repeated, when the decision result is "No". And the customer inserts the card 60 into the card inserting slot 11c, after visual confirmation of the card-insertion instruction screen 300 (refer to FIG. 11(c)).

Thereby, the processing of the card reading section 16 proceeds to the step SD10 after the decision result at the step SD9 is assumed to be "Yes". At the step SD10, the card reading section 16 outputs card data $D_c$ (an account number, a name, and soon) to the transaction control section 12, after the data $D_c$ are read from magnetic stripes of the inserted card 60.

Then, when the card data $D_c$ are input, the processing of the transaction control section 12 proceeds to a step SD12 after the waiting-for-printing screen 400 (refer to FIG. 11(d)) is displayed on the display/input section 13 at a step SD11. After acquiring, at the step SD12, customer information on the pertinent customer (account, name, and address) from the customer information data base DB with the card data $D_c$ as a key by access to the host computer 70 through the communication control section 24 and the network N, the processing of the transaction control section 12 proceeds to a step SD13.

After reading, at the step SD13, the form format-data for notification of change of an address from the storage section 19, the processing of the transaction control section 12 proceeds to a step SD14. After form-printing data for notification of change of an address is generated, using the form format-data, and the customer information (account, name, and address) acquired at the step SD12, the processing of the transaction control section 12 proceeds to the step SD15.

After the form-printing data are output to the form-printing control section 17, and, at the same time, a request for form printing is made to the form-printing control section 17 at the step SA15, the processing of the transaction control section 12 proceeds to a step SD16. Thereby, the form-printing control section 17 controls the printing section 14 for starting to print a form 40a shown in FIG. 3(a). At this time, according to the form-printing control section 17, the account number $P_1$, the name $P_2$, and the old address $P_3$, which are obtained from the customer information, are printed, using a font of standard, hand-written character such as the OCR-B font, in an account-number entry frame 41a, in a name entry frame 42a, and in an old-address frame 43a, respectively, as shown in FIG. 3(a).

The transaction control section 12 decides, based on the printing-completion signal from the form-printing control section 17, at the step SD16 whether the printing has been completed, and the decision is repeated in the present case, assuming that the decision result is "No". Then, the form-printing control section 17 outputs the printing-completion signal to the transaction control section 12 at completion of printing. Thereby, the processing of the transaction control section 12 proceeds to a step SD17, assuming that the decision result at the step SD16 is "Yes". After the transaction control section 12 gives an instruction for discharging of a form to the form-printing control section 17 at the step SD17, processing of the section 12 returns to the step SD1.

Thereby, the printing section 14 discharges the form 40a (refer to FIG. 3(a)) from the form-discharging slot 11a to the outside, based on control by the form-printing control section 17. After receiving the discharged form 40a, the customer makes the entered form 40b by entry, by hand, of the new address D4 into the new-address entry frame 44a, as shown in FIG. 3(b).

Thereafter, a customer pushes down the various-notification button 104 on the customer transaction screen 100 shown in FIG. 11(a) in a similar manner to those of the operations. Thereby, the decision result at the step SD2 shown in FIG. 13 becomes "Yes", and, various-notification processing for entered form 40b (refer to FIG. 3(b)) is executed at the step SD22 in a similar manner to that of the step SA18 (refer to FIG. 7).

Reduced costs, and smaller spaces for forms may be realized according to the one embodiment, as the form 30a is configured to be made as required at the side of the automatic transaction device, and there is no need to prepare various kinds of forms beforehand as described above, different from a conventional method.

The customer services may be improved according to this embodiment, as the entered form 30b is configured to be automatically accepted, and there is no need to perform the form processing at an information desk, different from a conventional method, to cause shorter waiting time of customers.

Moreover, the customer conveniences may be improved according to this embodiment, as the character recognition results are configured to be corrected, when there are differences between the character recognition results and the item image data, and there is no need for customers to add hand-written corrections to the entered forms 30b.

Furthermore, the time required to write in predetermined items to be entered may be shortened according to this embodiment, as the customer information such as a account number $P_1$, and a name $P_2$ is configured to be printed beforehand on the form 40a as shown in FIG. 3(a).

In addition, the number of errors in character recognition at the character recognition section 22 may be decreased according to the one embodiment, as account numbers $P_1$ are configured to be printed on the forms 40a shown in FIG. 3(a), using a standard font (for example, OCR-B font) for OCR character recognition.

One embodiment according to the present invention has been described in detail above, but specific configuration examples are not limited to the one embodiment, and even alterations in designs without departing from the spirits of the present invention may be included in the present invention. Various modifications and applications may occur to those skilled in the art without departing from the true spirit and scope of the present invention as defined in the appended claims.

For example, any kinds of forms maybe applied, though, in the above-explained embodiment, forms for notification of change of an address and those for notification of opening of a new account have been described as an example. An IC (Integrated Circuit) card, instead of the card 60, may be used, though, in the one embodiment, a case where the card 60 having magnetic stripes is used has been described as an example in the one embodiment.

Moreover, the form 40a may be configured to be made by reading the customer information from the following card 60 after storage of the pertinent customer information in a card 60, though a case where the customer information is acquired from the storage section 71 by access to the host computer 70 has been described as an example in the one embodiment.

In addition, the automatic transaction device 10 may be set up in an unmanned office of a financial institution, where transactions may be made for 24 hours in 356 days, though a case where the automatic transaction device 10 is set up in a manned office of a financial institution has been described as an example in the one embodiment. In this case, a customer enters predetermined items of a form, after bringing the made form home. Then, it is preferable for customers that the entered form may be accepted by the automatic transaction device 10 at a time zone when the operation ratio of the device 10 is comparatively low, for example, late at night on business days, or off days.

As described above, the present invention has an advantage that reduced costs, and smaller spaces for making forms may be realized, as forms are configured to be made as required at the side of the automatic transaction device, and there is no need to prepare various kinds of forms beforehand, different from a conventional method.

Furthermore, the customer services may be improved, as entered forms are configured to be automatically accepted by acceptance unit, and there is no need to perform form processing at an information desk, different from a conventional method, to cause shorter waiting time of customers.

Moreover, the customer conveniences may be improved, as correction unit is configured to be provided and character recognition results by acceptance unit are configured to be corrected, and there is no need for customers to add handwritten corrections to entered forms.

Furthermore, the time required to write in predetermined items to be entered may be shortened, as customer data are configured to be printed beforehand on forms.

In addition, reading errors in the form-reading unit may be reduced, as the customer data are configured to be printed on forms, using a standard font for optical character-recognition.

Industrial Applicability

As described above, the automatic transaction device according to the present invention is useful for transactions using forms in financial institutions.

What is claimed is:

1. An automatic transaction device for performing automatic transactions based on interaction with a customer, said automatic transaction device comprising:
    a format-data storage unit which stores format-data for a plurality of different forms;
    a selection unit with which the customer selects one form among said plurality of different forms;
    a form-making unit which reads format-data from said format-data storage unit that corresponds to said form selected by the customer, and creates a form based on the read format-data.
    a form-reading unit which reads an image of an entered form which is a form obtained after the customer has entered specific items into said form created by said form-making unit; and
    an acceptance unit which accepts the contents described in said entered form, based on the reading result by said form-reading unit.

2. The automatic transaction device according to claim 1, further comprising:
    a display unit which displays the reading result by said form-reading unit, and the acceptance result by said acceptance unit; and
    a correction unit which corrects said acceptance result, based on the contents displayed on said display unit.

3. The automatic transaction device according to claim 1, further comprising a customer data storage unit which stores customer data of said customer,
    wherein said form-making unit reads the customer data from said customer data storage unit, and creates a form based on the customer data and the format-data.

4. The automatic transaction device according to claim 3, wherein the customer data storage unit is a card which a customer holds, and comprises a storage function.

5. The automatic transaction device according to claim 3, wherein the customer data storage unit is a storage unit connected to a host computer set up in a remote place, and
    said form-making unit reads the customer data from said storage unit by access to said host computer through a communication line.

6. The automatic transaction device according to claim 3, wherein said form-making unit prints said customer data on said form, using a standard font for optical character recognition.

7. An automatic transaction device for performing automatic transactions based on interaction with a customer, said automatic transaction device comprising:
    a format-data storage unit which stores format-data for a plurality of different forms;
    a selection unit with which the customer selects one form among said plurality of different forms;
    a form-making unit which reads format data from said format-data storage unit that corresponds to said form selected by the customer, and creates a form based on the read format-data: and
    a customer data storage unit which stores customer data of said customer,
    wherein said form-making unit reads the customer data from said customer data storage unit, and creates a form based on the customer data and the format-data, and the customer data storage unit is a card which a customer holds, and comprises a storage function.

8. The automatic transaction device according to claim 7, wherein said form-making unit prints said customer data on said form, using a standard font for optical character recognition.

* * * * *

UNITED STATES PATENT AND TRADEMARK OFFICE
CERTIFICATE OF CORRECTION

PATENT NO. : 6,961,899 B2
APPLICATION NO. : 10/041584
DATED : November 1, 2005
INVENTOR(S) : Hideyuki Takahashi It is certified that error appears in the above-identified patent and that said Letters Patent is hereby corrected as shown below:

Column 21, line 29, change "format-data." to --format-data;--

Column 22, line 27, change "format data" to --format-data--

Column 22, line 30, change "format-data:" to --format-data;--

Signed and Sealed this

Fifteenth Day of August, 2006

JON W. DUDAS
*Director of the United States Patent and Trademark Office*